(12) United States Patent
Peppel

(10) Patent No.: US 6,974,020 B1
(45) Date of Patent: Dec. 13, 2005

(54) HIGH SPEED BAGGAGE DIVERTER

(76) Inventor: George W. Peppel, 720 Grandview Dr., Corsicana, TX (US) 75109

(*) Notice: Subject to any disclaimer, the term of this patent is extended or adjusted under 35 U.S.C. 154(b) by 0 days.

(21) Appl. No.: 10/847,035

(22) Filed: May 17, 2004

(51) Int. Cl.$^7$ .................................................. B65G 47/46
(52) U.S. Cl. ............................... 198/370.07; 198/370.08
(58) Field of Search .................. 198/370.06, 370.07, 198/370.08, 370.1, 371.2, 437, 442

(56) References Cited

U.S. PATENT DOCUMENTS

| | | |
|---|---|---|
| 1,729,671 A | 10/1929 | Bell-Irving et al. |
| 1,909,481 A | 5/1933 | Allen |
| 2,561,997 A | 7/1951 | Smith |
| 2,649,187 A | 8/1953 | Eggleston |
| 3,026,988 A | 3/1962 | Fisk |
| 3,045,801 A | 7/1962 | Graybeal |
| 3,093,236 A | 6/1963 | McLaughlin |
| 3,104,755 A | 9/1963 | Zuercher |
| 3,246,733 A | 4/1966 | Torbet et al. |
| 3,397,779 A | 8/1968 | Wilder |
| 3,447,670 A | 6/1969 | McKnight |
| 3,578,141 A | 5/1971 | Sheehan |
| 3,580,141 A | 5/1971 | Richter |
| 3,721,331 A | 3/1973 | Holbrook et al. |
| 4,179,020 A | 12/1979 | Heusler et al. |
| 4,284,187 A | 8/1981 | Kramer et al. |
| 4,298,117 A | 11/1981 | Kobayashi et al. |
| 4,441,604 A | 4/1984 | Schlig et al. |
| 4,457,420 A * | 7/1984 | Ducloux ................ 198/370.07 |
| 4,541,824 A | 9/1985 | Muller |
| 4,643,291 A | 2/1987 | Counter et al. |
| 4,711,357 A | 12/1987 | Langenbeck et al. |
| 4,850,471 A | 7/1989 | Annas, Sr. et al. |
| 5,205,393 A | 4/1993 | Malow et al. |
| 5,217,104 A * | 6/1993 | Pelletier ..................... 198/367 |
| 5,655,643 A * | 8/1997 | Bonnet .................. 198/370.08 |
| 5,692,593 A | 12/1997 | Ueno et al. |
| 5,715,930 A | 2/1998 | Hagenkamp |
| 5,909,796 A | 6/1999 | Soldavini |
| 5,988,356 A * | 11/1999 | Bonnet .................. 198/370.08 |
| 6,220,421 B1 * | 4/2001 | Hugon et al. .......... 198/370.07 |
| 6,536,580 B1 * | 3/2003 | Fritzsche ............... 198/370.07 |
| 6,607,065 B2 * | 8/2003 | Peppel .................. 198/370.01 |

* cited by examiner

*Primary Examiner*—James R. Bidwell
(74) *Attorney, Agent, or Firm*—Crutsinger & Booth, LLC

(57) ABSTRACT

The invention provides a diverter assembly for transferring moving articles from one conveying surface to another conveying surface, comprising: a) a frame; b) at least one endless belt suspended between spaced apart pulleys supported on the frame, wherein the endless belt defines an unsupported belt span for contacting articles on the one conveying surface and transferring the contacted article to the another conveying surface; and c) an actuator operably connected to the frame to move the unsupported belt span in a position to contact the article moving on the one conveying surface to transfer the article to the another conveying surface.

50 Claims, 7 Drawing Sheets

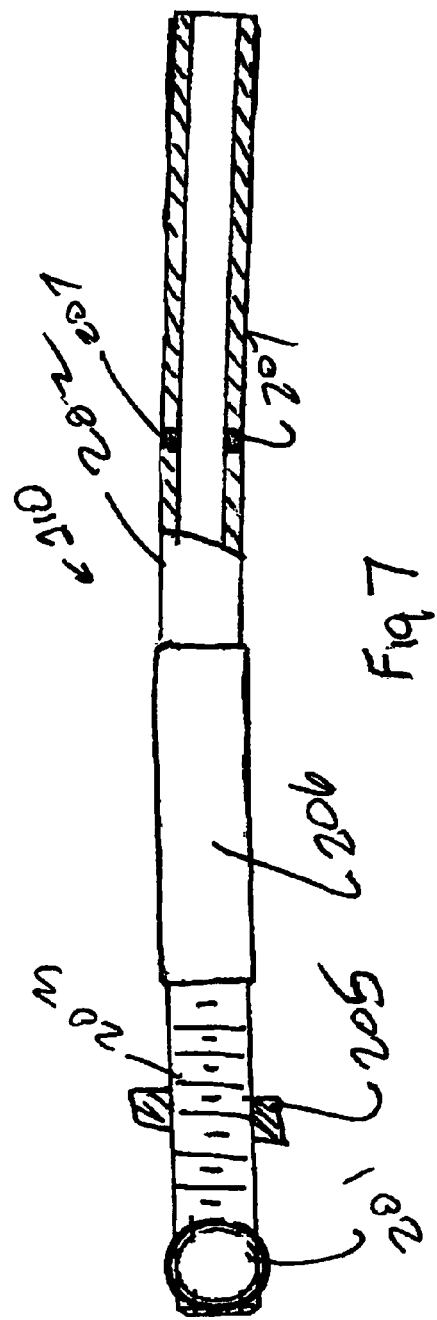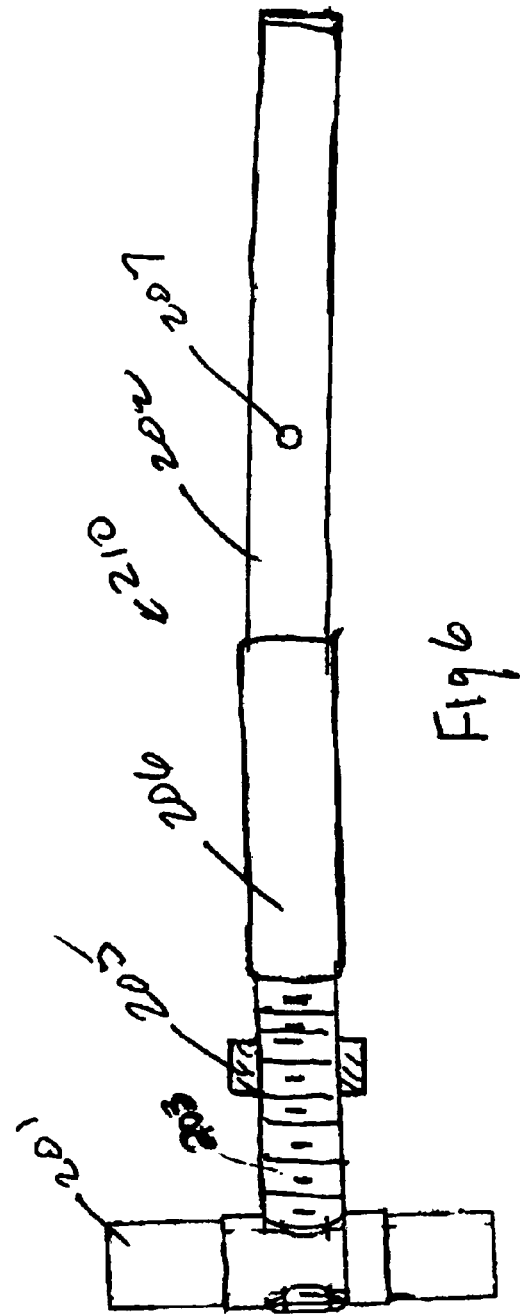

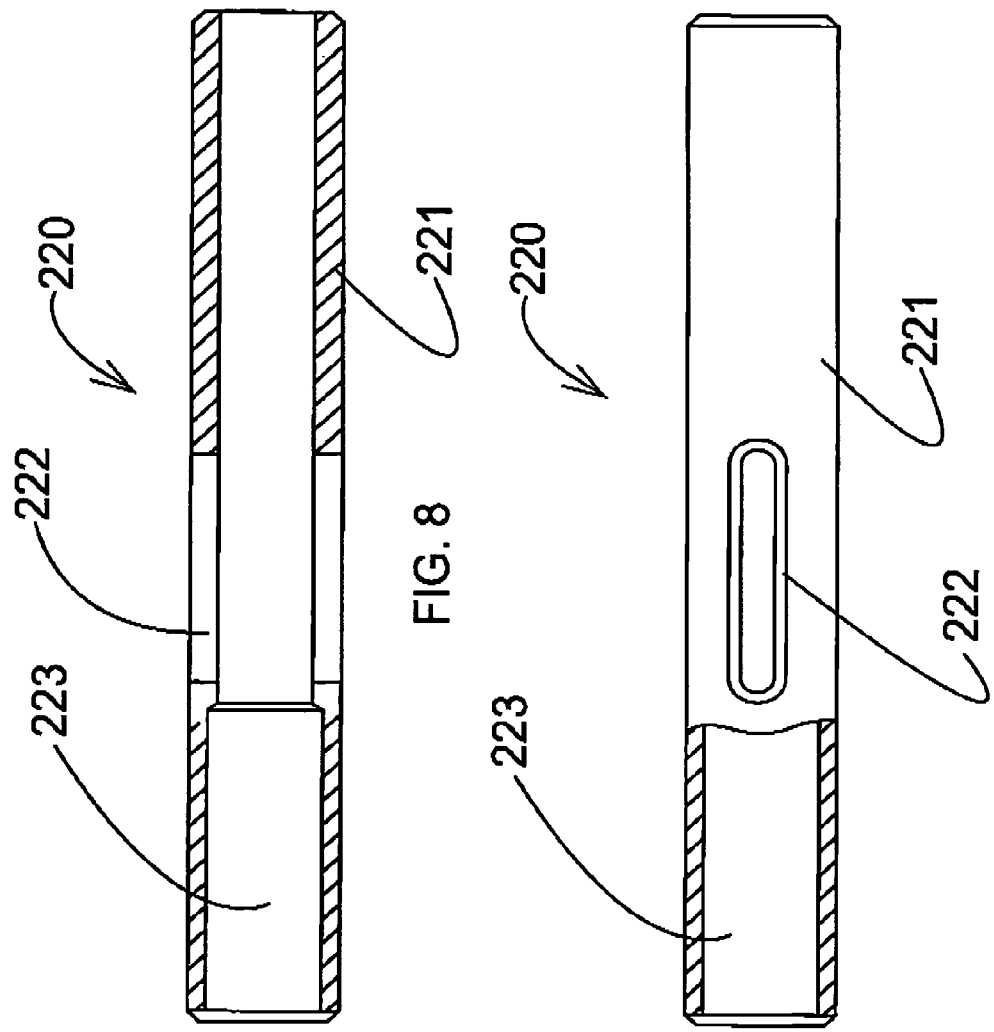

HIGH SPEED BAGGAGE DIVERTER

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The present invention relates to baggage diverters and, in particular, to high-speed baggage diverters.

BACKGROUND OF THE INVENTION

The present invention relates to baggage diverters and particularly to high-speed baggage diverters in a conveying system. Although the invention is especially advantageous to diverting articles in airport baggage conveying systems, or the like, the invention may be used to divert any kind of article on any kind of conveying system.

Diverter mechanisms have been employed to control the movement of articles on a conveyor system. A flipper arm of the diverter mechanism is operable to engage the articles to selectively move articles on and off conveyor lines. With an ever increasing need to move articles at higher conveyor speeds, many diverter designs are unable to actuate in the time required to transfer articles from one conveyor to another conveyor. Conventional diverter systems such as those shown in my U.S. Pat. No. 6,607,065, issued Aug. 19, 2003, selectively engage articles traveling on a conveyor to move the articles transversely off the conveyor. While adequate, these systems must apply forces to the article in a short time span to make it transversely a surfeit distance to remove it from the conveyor. The mechanism used in conventional diverters tend to result in acceleration-induced forces that increase in proportion with diverter speed, resulting in noise and potential damage to the baggage and to diverter components.

The ever increasing volume of articles traveling along conveyor systems creates a need for a diverter assembly capable of operating at higher speeds, while minimizing the impact with the diverter and damage to the articles.

In addition articles, such as baggage, typically comprise a variety of types, sizes and shapes that are randomly positioned on the conveying surface. These variables make some necessary processing steps such as x-ray examination and other article inspections difficult. Therefore, there is a need for a diverter system that positions and aligns articles on the conveyor system so that they can be properly processed.

SUMMARY OF THE INVENTION

The invention provides a diverter assembly for transferring moving articles from one conveying surface to another conveying surface, comprising: a) a frame; b) at least one endless belt suspended between spaced apart pulleys supported on the frame, wherein the endless belt defines an unsupported belt span for contacting articles on the one conveying surface and transferring the contacted article to the another conveying surface; and c) an actuator operably connected to the frame to move the unsupported belt span in a position to contact the article moving on the one conveying surface to transfer the article to the another conveying surface.

These and other objects, advantages, purposes, and features of the invention will become more apparent from the study of the following description taken in conjunction with the drawings.

BRIEF DESCRIPTION OF THE DRAWING FIGURES

FIG. 1A is a top view of the diverter assembly of the present invention installed in a conveyor system;

FIG. 1B illustrated is the article in a sequence of positions as it moves through diverter assembly;

FIG. 6 is a partially in section side view of the male flipper arm assembly for use in the diverter assembly;

FIG. 7 is a partially in section top view of the male flipper arm assembly for use in the diverter assembly;

FIG. 8 is a side sectional view of the female flipper arm assembly for use in the diverter assembly; and FIG. 9 is a partially in section top view of the female flipper arm assembly for use in the diverter assembly.

DETAILED DESCRIPTION OF PRESENTLY MOST PREFERRED EMBODIMENTS AND CURRENT BEST MODE

Figure 1A:
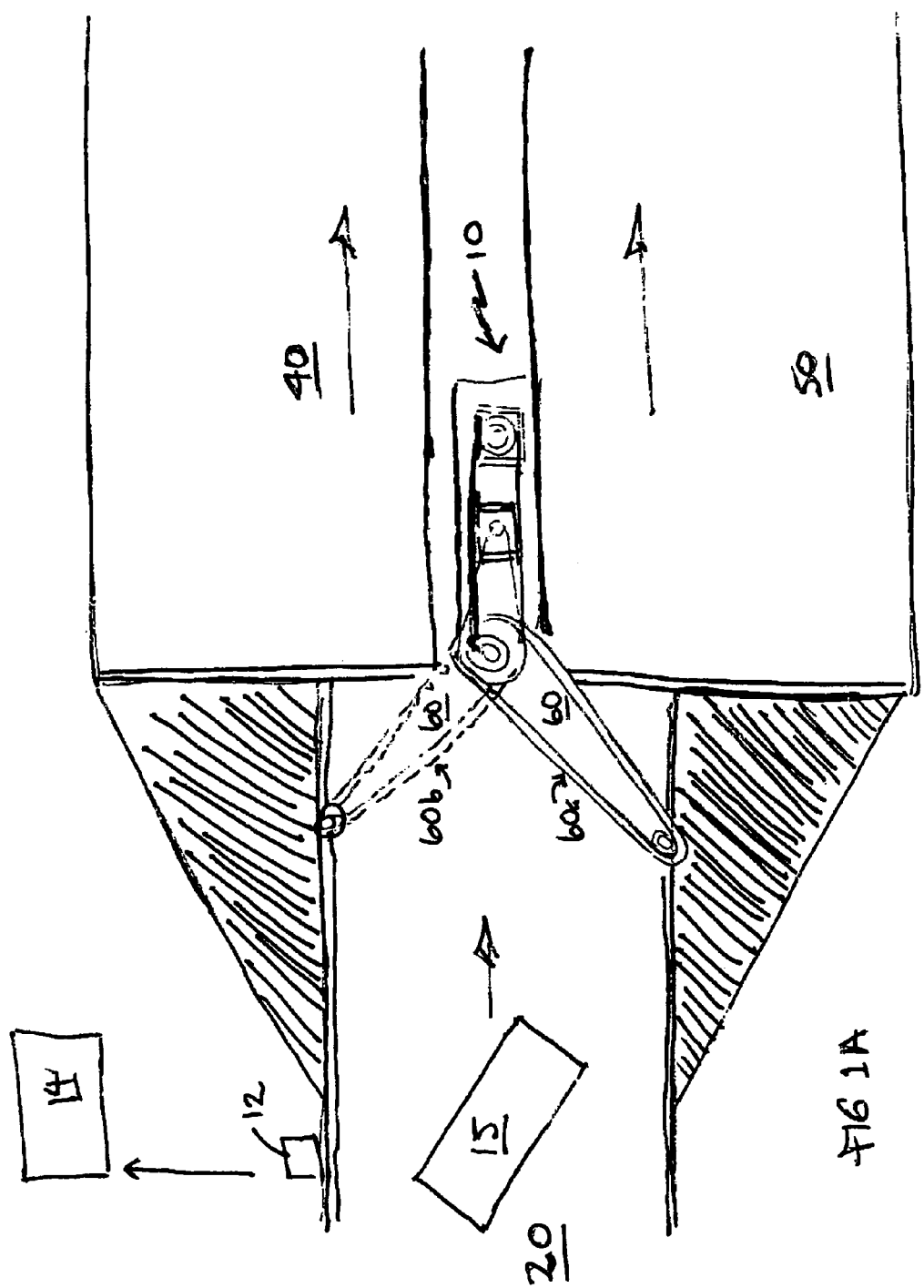

Referring to the drawings wherein like reference characters designate the same or corresponding parts throughout several views; illustrated in FIG. 1A is an embodiment of the diverter assembly, generally designated as numeral 10, in a conveyor system. An article 15 moves in the direction of the arrows down one conveying surface 20 onto another conveying surface. The another conveying surface could be only one output conveying surface or multiple output conveying surfaces, such as conveying surfaces 40, 50. Although the illustrated conveying surfaces are in the form of endless belts, other types of conveying surfaces, such as driven rollers or the like can be used.

As the article 15 moves along surface 20, a location sensor and/or bar code reader 12 is triggered at a specific distance from diverter assembly 10. The sensor 12 feeds a signal into a system computer 14. The system computer 14 determines onto which conveying surface 40, 50 the article 15 is to be diverted and selectively signals the diverter assembly 10 to move to the proper position. The diverter could also be programmed to remain on one diverting position. For example, the diverter assembly 10 could be used to divert all articles onto another conveying surface.

As will be described in detail, diverter assembly 10 has an actuator 62 that enables movement of the flipper arm assembly 60 between the positions 60a and 60b (shown in phantom) in response to control signals from computer 14. If the diverter assembly 10 is in the proper position, no signal is sent from the computer 14 to the diverter assembly 10. If the flipper arm assembly 60 is required to alternate its position, the system computer 14 sends a signal to cause the flipper arm assembly 60 to move to its alternate position. The flipper arm assembly 60 can also be programmed to remain in one position. For example, the flipper arm assembly 60 can be programmed to remain in the 60a position to continuously move articles from conveyor 20 to conveyor 40.

Figure 1B:
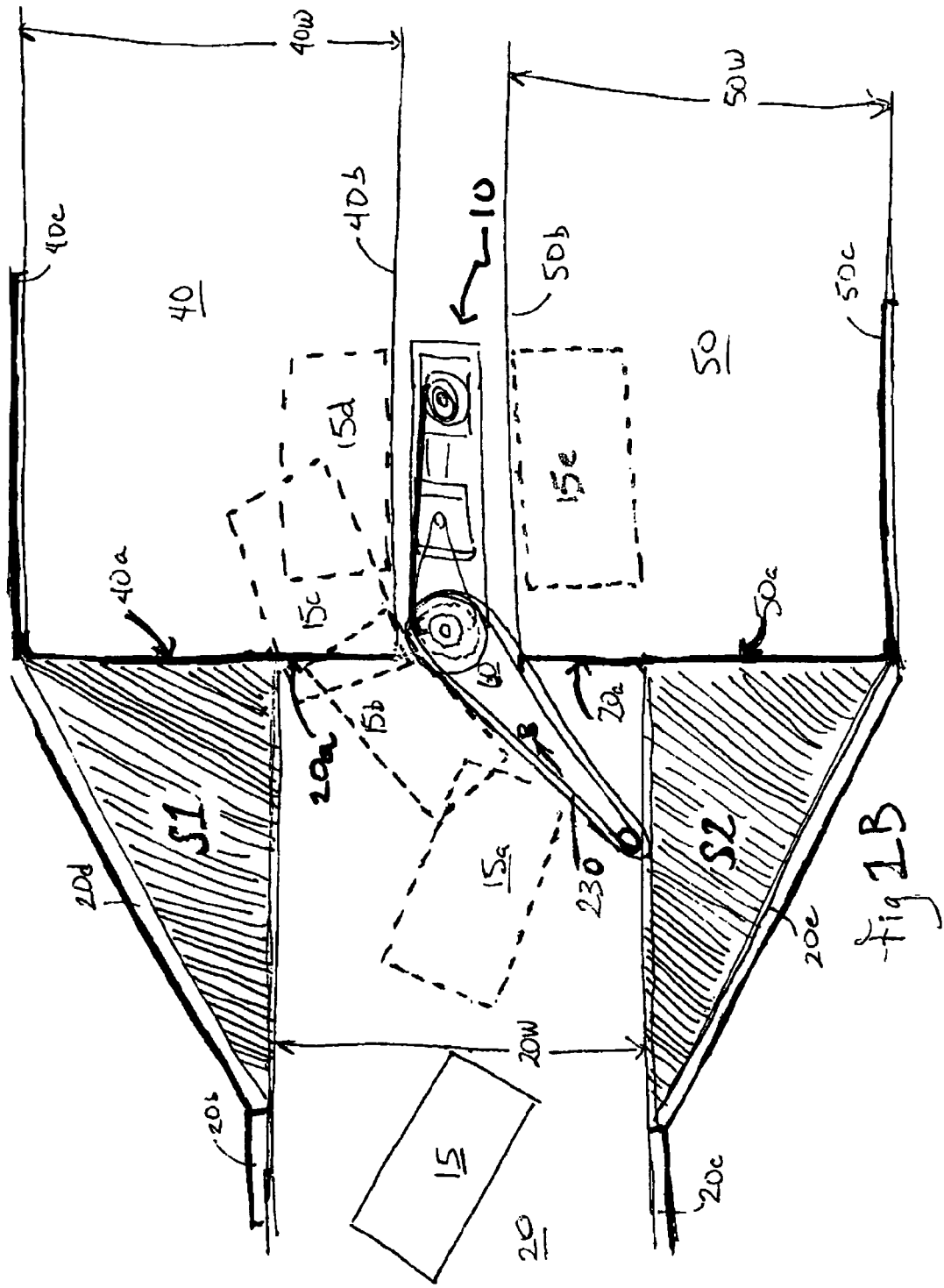

Turning now to FIG. 1B, illustrated is the article 15 in a sequence of positions 15a–15d as it moves through diverter assembly 10. The article 15 moves off the discharge end 20a of one conveying surface 20 and onto either receiving end 40a or 50a of another conveying surface 40 or 50, respectively. In conventional diverter assemblies, articles are diverted off of a moving conveyor, and therefore must be moved transversely the width of the conveyor. In the illustrated embodiment, receiving ends 40a, 50a of conveying surfaces 40, 50 are coplanar with discharge end 20a of conveying surface 20. The receiving ends 40a, 50a of conveying surfaces 40, 50 are each positioned in at least a partially offset parallel extending relationship with the discharge end 20a of conveying surface 20. Thus, the receiving ends 40a, 50a of conveying surfaces 40, 50 are horizontally positioned in a substantially nonaligned relationship with a discharge end 20a of the one conveying surface 20. By this arrangement of the conveying surfaces, the transverse distance that the article must travel to be diverted onto either conveying surfaces 40 or 50 is shortened. Because the transverse distance the article 15 must travel to be diverted is shortened, less impact or shock to the article by the flipper arm assembly 60 is required to divert the article 15.

The width of the conveyors 20W, 40W and 50W are typically 39 inches wide. The gap between the discharge end 40a and discharge end 50a is preferably 6 to 9 inches wide in order to allow enough space to place the diverter assembly 10. Thus, in a preferred embodiment, the conveying surfaces 40, 50 are aligned such that they are offset from the center of the conveyor 20 by less than one half the width 20W of the conveying surface 20. Furthermore, it is preferred that both receiving ends 40a, 50a of conveying surfaces 40, 50 are offset with the discharge end of conveying surface 20 by a substantially equal distance. In other words, it is preferred that the diverter assembly 10 is centrally aligned with the conveyor 20. It is possible that receiving ends 40a, 50a of conveying surface 40 or 50 can be offset by more than one half the width 20W of the one conveying surface 20, such that the conveying surfaces 40, 50 are offset by unequal distances.

Because the receiving ends 40a, 50a of conveying surfaces 40, 50 are only partially offset from the discharge end 20a of conveying surface 20, the movement of the article 15 from the discharge end 20a of conveying surface 20 to the receiving ends 40a and 50a of either conveying surfaces 40 and 50 is substantially linear. Because the article 15 does not travel transversely as much distance as conventional diverter systems, the article continues in substantially the same path during the diverting process. Although conveying surfaces 40, 50 are illustrated in FIGS. 1A and 1B in a parallel relationship to one another and to conveying surface 20, it is also possible that the conveying surfaces 20, 40, and 50 are in a non-parallel relationship. Also, it is understood by those skilled in the art that conveying surfaces 40, 50 would eventually lead to nonparallel paths once leaving the diverter assembly 10.

In the illustrated embodiment, guide surfaces S1 and S2 can be positioned to support the article as it moves from the one conveying surface 20 to conveying surfaces 40, 50. Guide surfaces S1 and S2 are preferably made of a material to facilitate the article's sliding onto another conveying surface 40, 50. Also, conveying surfaces 20, 40, and 50 are preferably run at the same speed.

Conveying surface 20 has side walls 20b and 20c that border the outside perimeter of conveying surface 20. Conveying surfaces 40, 50 can also have outer sidewalls 40c, 50c that border the outside perimeter to prevent the article 15 from falling off. Also illustrated are inner sidewalls 40b, 50b that can border inner side perimeter of conveyors 40, 50. Guide surfaces S1 and S2 can also have side walls 20d and 20e that border the outside perimeter.

As illustrated in FIG. 1B, the diverter assembly 10 aligns article 15 adjacent either inside perimeter 40b or 50b of conveying surface 40 or 50, respectively. As article 15 moves along conveyor 20, it comes into contact at position 11a with moving endless belt 230 of flipper arm assembly 60. On article's 15a contact with endless belt 230, which rotates in a clockwise direction B, the article is rotated by conveyor 20 and belt 230 to position 15b. From position 15b, the article 15b moves on until it comes into contact with conveyor 40 (See position 15c) and is pulled onto the conveyor 40 by contacting the moving surface of conveyor 40. This combined movement of conveyor 20, endless belt 230 of flipper arm assembly 60, and conveyor 40 works to align the article in position 15d adjacent the inner sidewall 40b of conveyor 40. The same process occurs when the flipper arm assembly 60 is in the alternate position 60b (FIG. 1A), and the article 15 is diverted and aligned adjacent inner sidewall 50b of conveyor 50. In that case, the endless belt 230 would be moving in a counterclockwise direction when the flipper arm assembly 50 is in the alternate position.

Figure 2:
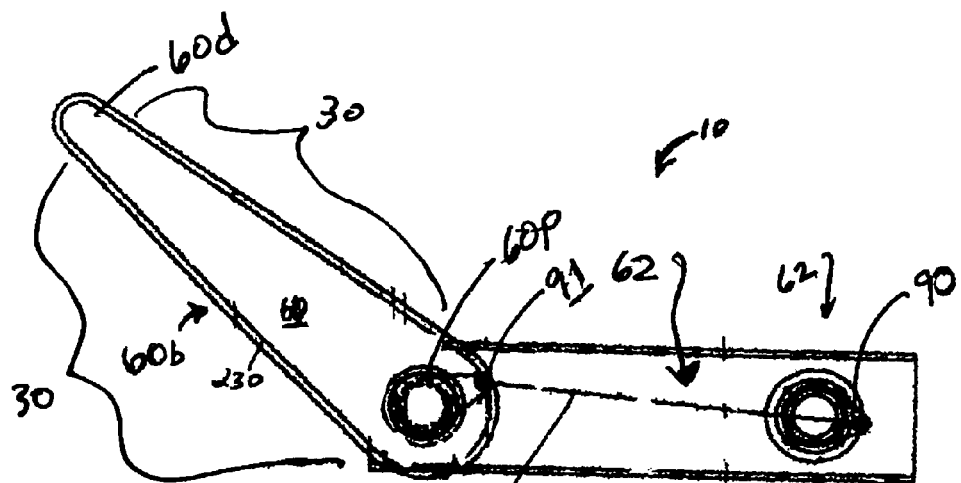
FIG. 2 is a partial diagramic top view of the flipper arm assembly in one position.
Figure 3:
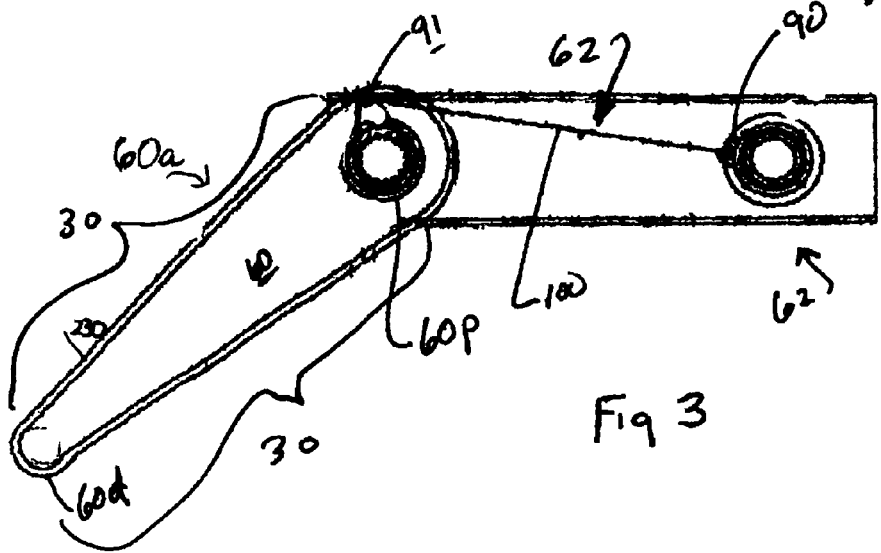
FIG. 3 is a partial diagramic top view of the flipper arm assembly of FIG. 2 in the alternate position.

Turning now to FIGS. 2 and 3, illustrated is a partial diagramic top view of the flipper arm assembly 60 in the two alternate positions 60a and 60b. As previously explained, the endless belt 230 moves in a clockwise direction when the flipper arm assembly 60 is in one position 60a, and the endless belt 230 moves in a counter-clockwise direction when the flipper arm assembly 60 is in the alternate position 60b.

The flipper arm assembly 60 is moved to the alternate position by actuator 62. Flipper arm assembly 60 has a distal end 60d and proximate end 60p. When actuated by actuator 62, the flipper arm assembly 60 is pivoted about the proximate end 60p. Preferably, the actuator 62 comprises a clutch/break assembly; however, other actuator systems using other power sources are envisioned. The actuator 62 is capable of moving each of the at least two unsupported belt spans 30 between spaced positions. The unsupported belt span 30 contacts the article moving on the one conveying surface 20 to transfer the article to the another conveying surface 40, 50.

Figure 4:
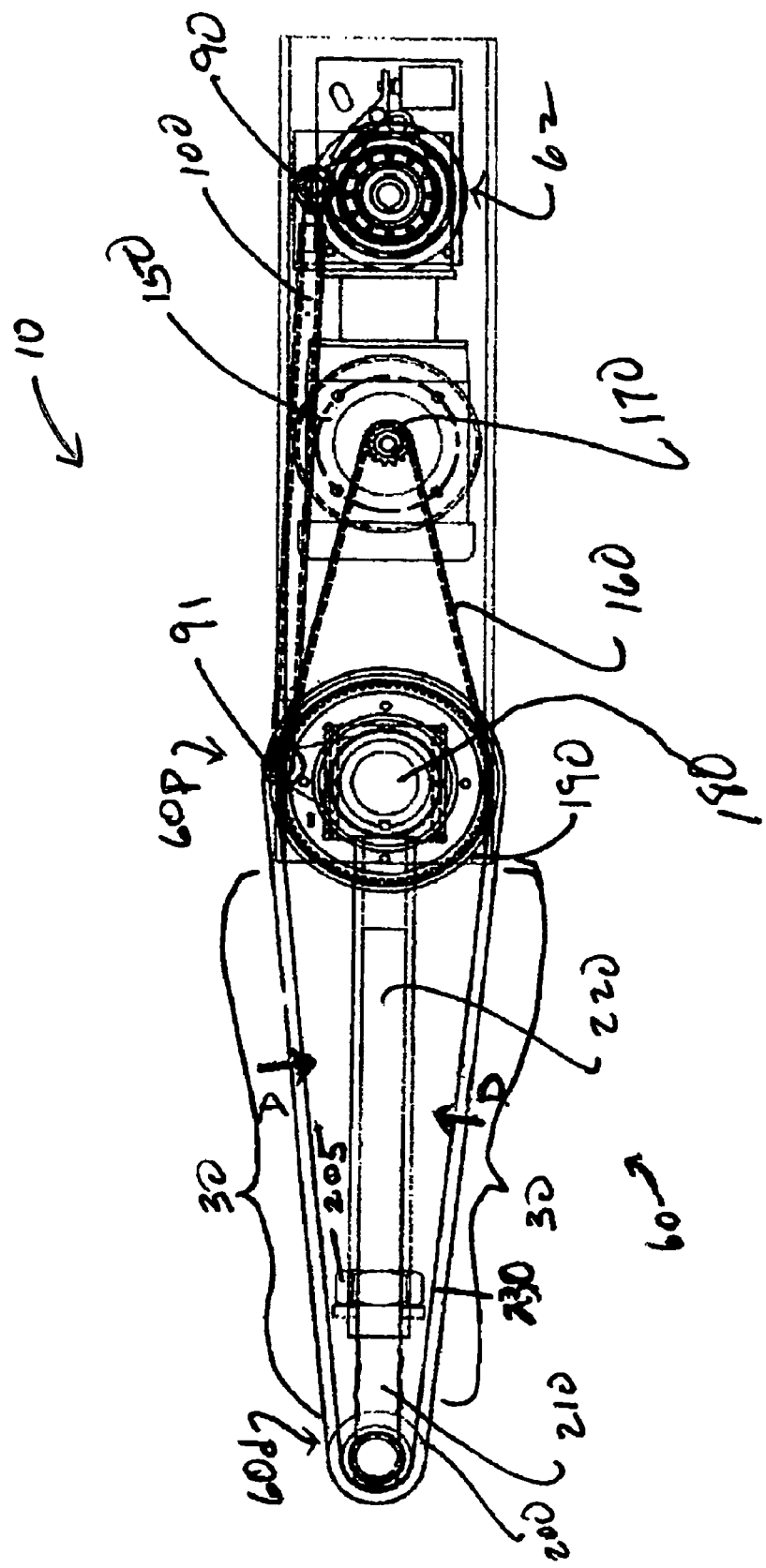
FIG. 4 is a partially in section top view of the diverter assembly.
Figure 5:
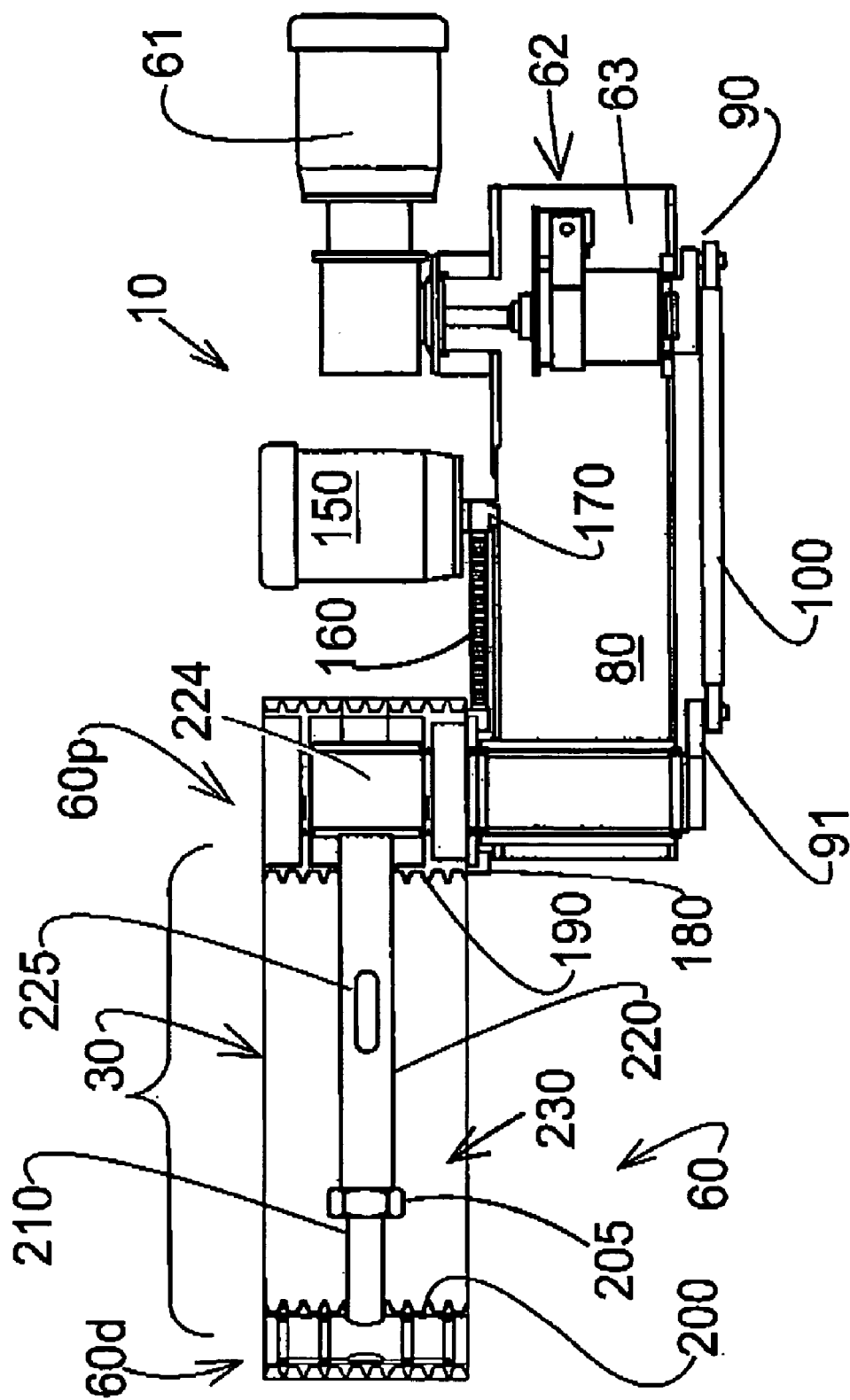
FIG. 5 is a partially in section side view of the diverter assembly.

FIGS. 4 and 5 illustrate a partially in section top view and a side view, respectively, of the diverter assembly 10. The diverter assembly comprises a frame 80 and at least one endless belt 230 suspended between spaced apart pulleys supported on the frame 80. Referring to FIGS. 4 and 5, with continuing reference to FIGS. 2 and 3, the flipper arm assembly 60 is actuated through a crank arm system powered by a motor. If the diverter assembly 60 is required to change to the alternate position, a signal is sent to the diverter assembly 10, causing the drive crank 90 to rotate 180 degrees and latch. Simultaneously, the belt drive motor 150 will reverse the direction of the endless belt 230. For each 180 degrees rotation of the drive crank 90, the flipper arm assembly 60 is rotated approximately 80 degrees using a mechanical link, such as connecting rod 100, between the drive crank 90 and the flipper crank arm 91. When actuator 62 is again actuated in order to rotate the flipper arm assembly 60 in the opposite direction, drive crank 90 is rotated another 180 degrees, which causes the flipper arm assembly 60 to rotate approximately 80 degrees in the opposite direction. The degree of rotation from one position 60a of the flipper arm assembly 60 to the alternate position 60b can vary, but in a particularly advantageous embodiment, the flipper arm assembly rotates 80 degrees to the alternate position. The belt drive motor 150 continually runs and only engages the drive crank 90 when necessary to move the flipper arm assembly 60.

The endless belt 230 defines an unsupported belt span 30 for contacting the article on the one conveying surface 20 and transferring the contacted article to the another conveying surface 40, 50 (conveying surfaces illustrated in FIG. 1). The endless belt 230 preferably comprises at least two unsupported belt spans 30 to contact the article on the one conveying surface 20 and transfer the contacted article to the another convey surface 40 or 50. Preferably, the unsupported belt span 30 is mounted on spaced apart pulleys 190 and 200, to deflect upon contact with the article and thereby absorb shock upon impact with the article.

The unsupported belt span 30 has no back up surface or support, which allows the unsupported span 30 to deflect in the direction of arrows "D" without engaging a rigid support of the flipper assembly 60. The flipper arm assembly 60 comprises an unsupported belt span 30 of the endless belt 230 that is supported on a flipper frame 80, comprising male and female flipper arm subassemblies 210 and 220, respectively. In the illustrated embodiment, endless belt 230 is a single belt, but other surfaces are possible, such as driven or non-driven rollers, or the like. The endless belt 230 can also comprise a plurality of separate vee belts. The plurality of separate vee belts provide a power face belt that advantageously absorbs and deflects the shock of articles in a direction transverse to the direction of the one conveying surface 20.

The diverter assembly 10 can further comprise a power source for moving the endless belt 230 about the at least two spaced apart pulleys 190, 200, or sheaves. The unsupported belt span 30 contacts the article moving on the one conveying surface 20 to transfer the article to the other conveying surfaces 40, 50.

Endless belt 230 is continuously powered by motor 150. As illustrated in FIG. 4, flipper drive shaft 180 includes a drive sprocket or pulley 181 that is illustrated in FIG. 5. The drive sprocket or pulley 181 is mounted thereon and engages a belt 160 from a motor 150 to drive the belt 230 of the flipper arm assembly 60. The belt 160 extends around sheave 170, which is powered to move by reversible drive motor 150. Belt 160 can comprise a timing belt, a vee belt, or the like.

Preferably, the angle of the unsupported belt span 30 of the endless belt 230 to the conveying surface 20 is from about 20 degrees to about 60 degrees. More preferably, the angle of the unsupported belt span 30 to the conveying surface is from about 40 to 45 degrees.

The endless belt 230 can be driven at a speed greater than the speed of the one conveying surface 20. The endless belt 230 is driven by a drive motor 150 for driving the belt 230 about the pulleys 190, 200. Preferably, the diverted article substantially maintains the same speed when diverted as compared to the speed of the one conveying surface 20. The endless belt 230 can be driven at a speed of at least 510 feet per minute. Preferably, the endless belt 230 is driven at a speed equal to the one conveying surface 20 divided by the cosine of the angle between the conveying direction on the one conveying surface 20 and the diverting direction of the unsupported belt span 30 of the endless belt 230. Thus, the unsupported belt span 30 of the endless belt 230 is preferably fifty percent faster than the article's forward speed.

The diverter assembly 10 is not affected by the size of the articles being diverted. As will be appreciated by those skilled in the art, the diverter assembly 10 diverts articles at a very high speed. With a speed of 360 feet per minute on the first conveying surface 20, the speed of the diverter assembly 10 may divert at a rate of 60 articles or bags a minute, and in some cases 80 bags a minute. With smaller articles, such as articles having dimensions of less than one foot, as many as 140 bags per minute can be diverted.

The frame of flipper arm assembly 60 comprises a male flipper arm subassembly 210 and a female flipper arm subassembly 220 that are telescoped together. The flipper arm assembly 60 is pivotally mounted to the frame 80 and pivots about the shaft 180 at the proximate end 60p. Turning to FIGS. 6 and 7, with continuing reference to FIGS. 4 and 5, illustrated is a partially in section side and top view of the male flipper arm assembly 210 for use in the diverter assembly 10. Tubular form 202 of male flipper arm assembly 210 is inserted into enlarged portion 206. An adjusting nut 205 is in threaded engagement with portion 203. An enlarged portion 206 is formed adjacent the threaded portion 203, and a bore 207 enters through the tubular form 202. A shaft 201 is connected to one end of tubular frame 202 of subassembly 211 for rotatably supporting nose sheave 200.

FIGS. 8 and 9 are a side view and top view, respectively, of the female flipper arm subassembly 220. Subassembly 220 has a hollow tubular body 221 with a slot 222 entering there through. The tubular body 221 has an enlarged interior socket 223 adjacent one end and is mounted to rotate about shaft 180 (FIG. 4) by sleeve 224 (FIG. 5). Socket 223 is of a size to receive portion 206 in telescoping relationship. By adjusting the nut 205 on threads end 203 of male flipper arm subassembly 210 as shown in FIGS. 6 and 7, the extension into socket 223 can be adjusted. This telescoping connection between subassemblies 210 and 220 allows the assembled length to be varied to adjust the turning in bolt 230. A bolt and nut assembly 225 can be located to extend through bore 207 and slot 222. In this way, the length of the flipper arm assembly can be adjusted to extend as far as necessary to divert the article.

The flipper arm assembly 60 can preferably be about 10 to 12 inches high above the conveying surface, but can be adjusted as needed for baggage diverting applications. In this way, the diverter assembly 10 will contact most baggage above their center-of-gravity (cg) or at least at or above the mid-height of the baggage, minimizing the risk of the baggage toppling over the flipper arm assembly 60. The diverter assembly 10 is mounted adjacent a conveyor surface or between two conveyor surfaces by any conventional means to allow the diverter assembly 10 to pivot to its alternate position. The diverter assembly 10 can also be mounted such that it remains in a stationary position.

Advantageously, the invention extends below the conveying surface by no more than 18 inches and preferably, no more than 12 inches. In this way, the invention provides a more compact diverter assembly 10 below the conveying surface for overhead applications to provide maximum clearance under the diverter assembly. The invention also provides for the majority of the diverter assembly 10 to be located beneath the conveyor with minimal lateral extension beyond the width of the conveying surface. This reduces the footprint of the diverter assembly 10, which is especially desirable for floor level installations.

The invention also provides for a method of diverting articles moving in a conveying system comprising: a) providing a frame 80; b) providing at least one endless belt 230 suspended between spaced apart pulleys 190, 200 supported on the frame 80, wherein the endless belt 230 defines an unsupported belt span 30 for contacting an article on the one conveying surface 20 and transferring the contacted article to the another conveying surface 40, 50; c) moving the article along the one conveying surface 20 in a conveying direction, wherein the one conveying surface 20 has a discharge end 20*a*; d) discharging the article from the discharge end 20*a* of one conveying surface 20; and e) selectively diverting the article onto the receiving end 40*a*, 50*a*, of the another conveying surface 40, 50 by contacting the article with the unsupported belt span 30, wherein the article is diverted in a transverse direction with respect to the conveying direction.

The invention also provides for a method of diverting articles moving in a conveying system comprising: a) providing a frame 80; b) providing at least one endless belt 230 suspended between spaced apart pulleys 190, 200 supported on the frame 80, wherein the endless belt 230 defines an unsupported belt span 30 for contacting an article on the one conveying surface 20 and transferring the contacted article to the another conveying surface 40, 50; and c) actuating the diverter assembly 10 to selectively position the unsupported belt span 30 in contact with the selected article moving along the one conveying surface 20, thereby substantially absorbing and deflecting the shock of the article in a direction transverse to the conveying direction.

The invention also provides for a method of diverting articles moving in a conveying system comprising: a) providing one conveying surface 20 having a discharge end 20*a*; b) providing another conveying surface 40, 50, wherein the another conveying surface 40, 50 has an inside perimeter and an outside perimeter; c) moving a randomly positioned article along the one conveying surface 20; and d) selectively diverting the article onto the discharge end of the another conveying surface 40, 50, wherein the article is aligned adjacent the inside perimeter of the another conveying surface. Preferably, the article is selectively oriented adjacent the inside perimeter of the another conveying surface.

After careful consideration of the specific and exemplary embodiments of the present invention described herein, a person of ordinary skill in the art will appreciate that certain modifications, substitutions and other changes may be made without substantially deviating from the principles of the present invention. The detailed description is illustrative, the spirit and scope of the invention being limited only by the appended claims.

What is claimed is:

1. A diverter assembly for selectively transferring articles of baggage from an input conveying surface having a discharge end to one of multiple output conveying surfaces, comprising:
   a) a frame;
   b) at least one endless belt suspended and moving along a path between spaced apart pulleys supported on the frame, wherein the endless belt defines a belt span for contacting an article on the one conveying surface and transferring the contacted article of baggage to one of the multiple conveying surfaces, wherein at least one of the multiple output conveying surfaces has a receiving end, only a portion of which is positioned in a laterally overlapping and adjacent relationship with a portion of the discharge end of the input conveying surface; and
   c) an actuator operably connected to the frame to move the belt span into a position to contact the article moving on the one conveying surface and transfer the article to one of the multiple output conveying surfaces.

2. The diverter assembly according to claim 1, wherein the at least one endless belt comprises at least two belt spans, the actuator operably connected to selectively move either belt span into contact with the article on the input conveying surface and transfer the contacted article to one of the multiple output conveying surfaces.

3. The diverter assembly according to claim 1, wherein the at least one endless belt comprises a single belt having a plurality of wedge-shaped protrusions thereon.

4. The diverter assembly according to claim 2, wherein the actuator is capable of moving each of the at least two belt spans between a first and second position, and when in the first position, one of the belt spans contacts articles moving on the input conveying surface to transfer the articles to one of the multiple output conveying surfaces, and when in the second position, the other belt span contacts articles moving on the input conveying surface to transfer the articles to another of the multiple output conveying surfaces.

5. The diverter assembly according to claim 1, wherein the belt span is mounted on spaced apart pulleys to deflects upon contact with the article and thereby absorb shock, the span deflecting without engaging a rigid support.

6. The diverter assembly according to claim 1, wherein the multiple output conveying see comprises an inside perimeter, and the article is substantially aligned adjacent the inside perimeter of one of the multiple output conveying surfaces when the article is transferred to one of the multiple output conveying surfaces.

7. The diverter assembly according to claim 2, wherein the multiple output conveying surfaces comprise two spaced apart output conveying surfaces, and the at least two belt spans selectively contacts each article traveling on the input conveying surface to selectively transfer the article to one of the two spaced apart output conveying surfaces.

8. The diverter assembly according to claim 1, wherein the multiple output conveying surfaces comprise a first and second output conveying surface, each having receiving ends that are positioned in an at least partially overlapping relationship with the discharge end of the input conveying surface.

9. The diverter assembly according to claim 1, wherein the diverter assembly further comprises a power source for moving the at least one endless belt about the pulleys.

10. The diverter assembly according to claim 9, wherein the endless belt moves at a speed greater than the speed of the input conveying surface.

11. A diverter assembly for transferring articles of baggage from an input conveyor to one of two output conveyors, comprising:
    a) a diverter assembly having an arm pivoting between first and second positions about a stationary pivot point;
    b) at least one endless belt suspended on the arm and movable along an endless path; and
    c) an actuator operably connected to the arm to pivot the arm into the first position to contact an article of baggage while moving on the input conveyor and transfer the article to one of the two output conveyors, the arm contacting the article while the article is at least partially on the one output conveyor, and to pivot the arm into the second position to contact an article while moving on the input conveyor and transfer the article to the other output conveyor, the arm contacting the article while the article is least partially on the other output conveyor.

12. The diverter assembly according to claim 11, wherein the another conveying surface output conveyors comprises at least two spaced apart output conveyors, wherein at least one of the two output conveyors has a receiving end, a portion of which is positioned in a laterally overlapping and adjacent relationship with a portion of the discharge end of the input conveyor.

13. The diverter assembly according to claim 12, wherein the at least two spaced apart output conveyors are substantially coplanar with the input conveyor.

14. A method of selectively transfering articles of baggage from an input conveying surface having a discharge end to one of multiple output conveying surfaces, each having a receiving end, the method comprising:
   a) moving a baggage article along the input conveying surface in a conveying direction,
   b) discharging the article from the discharge end of the input conveying surface;
   c) receiving the article onto the receiving end of one of the multiple output conveying surfaces, wherein a portion of the receiving end of at least one of the multiple output conveying surfaces is positioned in a laterally overlapping and adjacent relationship with a portion of the discharge end of the input conveying surface; and
   d) selectively diverting the article onto the receiving end of one of the multiple output conveying surfaces by contacting the article with an endless belt suspended between at least two spaced apart pulleys, the endless belt perpendicular to the conveying surfaces, wherein the article is diverted at least partially in a transverse direction with respect to the conveying direction.

15. A method of diverting baggage articles moving in a conveying system comprising:
   a) pivoting an arm, having at least one endless belt supported thereon, about a stationary pivot into a first position wherein the endless belt contacts a baggage article while the article is moving on an input conveyor, and transfers the article to one of two output conveyors, the endless belt contacting the article while the article is at least partially on the output conveyor; and
   b) pivoting the arm about a stationary pivot into a second position wherein the endless belt contacts an article while the article is moving on the input conveyor and transfers the article to the other output conveyor, the endless belt contacting the article while the article is at least partially on the output conveyor.

16. The method according to claim 15, wherein the endless belt has an unsupported span which is mounted to deflect upon contact with an article.

17. The method according to claim 15, further comprising the step of moving the endless belt at a speed greater than that of the input conveyor.

18. The method according to claim 17, further comprising the step of moving the endless belt at a speed approximately equal to the speed of the input conveyor divided by the cosine of the angle between the direction of movement of the input conveyor and the endless belt.

19. A method of selectively diverting a plurality of baggage articles moving in a conveying system from an input conveying surface having a discharge end to one of multiple output conveying surfaces, each output conveying surface having a receiving end and a perimeter, comprising:
   a) moving a plurality of randomly positioned baggage articles along an input conveying surface in a conveying direction; and
   b) selectively diverting each article onto the receiving end of one of the multiple output conveying surfaces, and aligning each article adjacent the perimeter of one of the output conveying surfaces, wherein each article is contacted with an endless belt suspended between at least two spaced apart pulleys, the endless belt perpendicular to the conveying surfaces.

20. The method according to claim 19, wherein selectively diverting comprises selectively orientating each article adjacent an inside perimeter of an output conveying surface.

21. The method according to claim 19, wherein multiple output conveying surfaces comprises at least two spaced apart conveying surfaces.

22. The diverter assembly according to claim 5, wherein the belt span is unsupported.

23. The diverter assembly according to claim 4, wherein the actuator is capable of moving the belt spans between the first and second positions by rotating the belt spans about a stationary pivot point.

24. The diverter assembly according to claim 6, further comprising at least one stationary surface positioned adjacent the input conveying surface.

25. The diverter assembly according to claim 1, wherein the endless belt is capable of moving in opposite directions.

26. The diverter assembly according to claim 4, wherein the endless belt moves in one direction when the belt spans are in the first position and moves in the opposite direction when the belt spans are in the second position.

27. The diverter assembly according to claim 6, wherein the combined movement of the input conveying surface, the endless belt and one of the multiple output conveying surfaces substantially aligns articles adjacent the inside perimeter of the output conveying surface.

28. The diverter assembly according to claim 1, wherein the multiple output conveying surfaces are generally parallel with the input conveying surface.

29. The diverter assembly according to claim 11, wherein the at least one endless belt comprises a single belt having a plurality of wedge-shaped protrusions thereon.

30. The diverter assembly according to claim 11, wherein the endless belt is deflected upon contact with the article and thereby absorbs shock.

31. The diverter assembly according to claim 30, wherein the endless belt is unsupported.

32. The diverter assembly according to claim 11, wherein one of the output conveyors comprises an inside perimeter, and an article is substantially aligned adjacent the inside perimeter when the article is transferred to the one output conveyor.

33. The diverter assembly according to claim 11, wherein each of the output conveyors have receiving ends that are positioned in a laterally overlapping and adjacent relationship with a portion of the discharge end of the input conveyor.

34. The diverter assembly according to claim 11, wherein the endless belt moves at a speed greater than the speed of the input conveyor.

35. The diverter assembly according to claim 11, further comprising at least one stationary surface positioned adjacent the input conveyor.

36. The diverter assembly according to claim 11, wherein the endless belt is capable of moving in opposite directions.

37. The diverter assembly according to claim 36, wherein the endless belt moves in one direction when the arm is in the first position and moves in the opposite direction when the arm is in the second position.

38. The diverter assembly according to claim 32, wherein the combined movement of the input conveyor, the endless belt and the one output conveyor substantially aligns the article adjacent the inside perimeter of the one output conveyor.

39. The method according to claim 14, further comprising the step of moving the endless belt at a speed greater than that of the input conveyor.

40. The method according to claim 15, further comprising the step of moving the endless belt in one direction when the arm is in the first position and moving the endless belt in the opposite direction when the endless belt is in the second position.

41. The method according to claim 14, further comprising the step of deflecting the endless belt upon contact with the article and thereby absorbing shock.

42. The method according to claim 14, further comprising the step of substantially aligning the article along an inside perimeter of one of the multiple output conveying surfaces when the article is selectively diverted.

43. The method according to claim 19, further comprising the step of moving the endless belt at a speed greater than that of the input conveying surface.

44. The method according to claim 15, further comprising the step of deflecting the endless belt upon contact with the article and thereby absorbing shock.

45. The method according to claim 19, further comprising the step of deflecting the endless belt upon contact with each article and thereby absorbing shock.

46. The method of claim 39, further comprising the step of moving the endless belt at a speed approximately equal to the speed of the input conveying surface divided by the cosine of the angle between the direction of movement of the input conveying surface and the endless belt.

47. The method of claim 45, further comprising the step of moving the endless belt at a speed approximately equal to the speed of the input conveyor divided by the cosine of the angle between the direction of movement of the input conveyor and the endless belt.

48. The method of claim 14, wherein the endless belt has an unsupported span and further comprising the step of deflecting the unsupported belt span upon contact with the article, the unsupported span deflecting without engaging a rigid support.

49. The method of claim 15, wherein the endless belt has an unsupported span and further comprising the step of deflecting the unsupported belt span upon contact with the article, the unsupported span deflecting without engaging a rigid support.

50. The method of claim 19, wherein the endless belt has an unsupported span and further comprising the step of deflecting the unsupported belt span upon contact with each article, the unsupported span deflecting without engaging a rigid support.

* * * * *